United States Patent
Alberth, Jr.

(10) Patent No.: US 10,648,690 B2
(45) Date of Patent: May 12, 2020

(54) MULTI-FUNCTION THERMOSTAT WITH EVENT SCHEDULE CONTROLS

(71) Applicant: Johnson Controls Technology Company, Auburn Hills, MI (US)

(72) Inventor: William P. Alberth, Jr., Prairie Grove, IL (US)

(73) Assignee: Johnson Controls Technology Company, Auburn Hills, MI (US)

( * ) Notice: Subject to any disclaimer, the term of this patent is extended or adjusted under 35 U.S.C. 154(b) by 62 days.

(21) Appl. No.: 15/951,790

(22) Filed: Apr. 12, 2018

(65) Prior Publication Data

US 2018/0299162 A1 Oct. 18, 2018

Related U.S. Application Data

(60) Provisional application No. 62/485,767, filed on Apr. 14, 2017.

(51) Int. Cl.

| | |
|---|---|
| *F24F 11/61* | (2018.01) |
| *F24F 11/59* | (2018.01) |
| *F24F 11/52* | (2018.01) |
| *G06F 3/0488* | (2013.01) |
| *F24F 120/10* | (2018.01) |

(52) U.S. Cl.
CPC ............ *F24F 11/61* (2018.01); *F24F 11/52* (2018.01); *F24F 11/59* (2018.01); *G06F 3/04883* (2013.01); *F24F 2120/10* (2018.01)

(58) Field of Classification Search
CPC .................. F24F 11/61; F24F 11/59
See application file for complete search history.

(56) References Cited

U.S. PATENT DOCUMENTS

| | | | |
|---|---|---|---|
| 7,114,554 B2 | 10/2006 | Bergman et al. | |
| 7,181,317 B2 | 2/2007 | Amundson et al. | |
| 7,274,972 B2 | 9/2007 | Amundson et al. | |
| 7,604,046 B2 | 10/2009 | Bergman et al. | |
| 7,634,504 B2 | 12/2009 | Amundson | |
| 7,636,604 B2 | 12/2009 | Bergman et al. | |
| 7,693,582 B2 | 4/2010 | Bergman et al. | |
| 7,706,923 B2 | 4/2010 | Amundson et al. | |
| 7,861,941 B2 | 1/2011 | Schultz et al. | |
| 7,890,195 B2 | 2/2011 | Bergman et al. | |
| 8,170,720 B2 | 5/2012 | Amundson et al. | |
| 8,219,251 B2 | 7/2012 | Amundson et al. | |
| 8,244,383 B2 | 8/2012 | Bergman et al. | |
| 8,346,396 B2 | 1/2013 | Amundson et al. | |
| 8,606,409 B2 | 12/2013 | Amundson et al. | |

(Continued)

*Primary Examiner* — Vincent H Tran
(74) *Attorney, Agent, or Firm* — Foley & Lardner LLP

(57) ABSTRACT

A multi-function thermostat for a building space includes a user interface capable of visually representing an event schedule. The thermostat is configured to receive a request to modify an event schedule associated with the multi-function thermostat. The thermostat is configured to receive a puncturing event with a time interval that conflicts with a time interval associated with an existing event. The thermostat is configured to store information associated with the puncturing event in a memory. The thermostat is configured to modify the time interval associated with the existing event. The thermostat is configured to add the puncturing event in the event schedule. The thermostat is configured to add an adjustment event in the event schedule.

20 Claims, 11 Drawing Sheets

(56) References Cited

U.S. PATENT DOCUMENTS

| | | |
|---|---|---|
| 8,620,460 B2 | 12/2013 | Bergman et al. |
| 8,768,521 B2 | 7/2014 | Amundson et al. |
| 8,903,552 B2 | 12/2014 | Amundson et al. |
| 8,914,724 B2 * | 12/2014 | Cipollo ............... G06F 3/04847 700/1 |
| 9,471,069 B2 | 10/2016 | Amundson et al. |
| 9,733,653 B2 | 8/2017 | Amundson et al. |
| 2012/0116592 A1 * | 5/2012 | Koushik ............ G05D 23/1904 700/276 |
| 2012/0296488 A1 * | 11/2012 | Dharwada ............. H02J 13/001 700/296 |
| 2013/0204441 A1 * | 8/2013 | Sloo ........................ F24F 11/30 700/276 |
| 2013/0211783 A1 * | 8/2013 | Fisher .................... G06F 11/30 702/182 |
| 2015/0058779 A1 * | 2/2015 | Bruck ................ G05D 23/1904 715/771 |
| 2015/0204569 A1 * | 7/2015 | Lorenz .................. G05B 15/02 700/278 |
| 2017/0019697 A1 * | 1/2017 | Hundemer .............. H04L 67/18 |
| 2017/0132727 A1 * | 5/2017 | Yang .................. G06Q 10/1097 |
| 2017/0300073 A1 | 10/2017 | Amundson et al. |
| 2018/0023832 A1 * | 1/2018 | Fadell ................ G05D 23/1902 700/278 |
| 2018/0023836 A1 * | 1/2018 | Quam ..................... F24F 11/30 700/276 |
| 2019/0234636 A1 * | 8/2019 | Combe ................... F24F 11/30 |

\* cited by examiner

MULTI-FUNCTION THERMOSTAT WITH EVENT SCHEDULE CONTROLS

CROSS-REFERENCE TO RELATED PATENT APPLICATION

This application claims the benefit of and priority to U.S. Provisional Patent Application No. 62/485,767 filed Apr. 14, 2017, the entire disclosure of which is incorporated by reference herein.

BACKGROUND

The present disclosure relates generally to multi-function thermostats for use in monitoring and controlling a building management system or a building space. The present disclosure relates more particularly to adjusting a time schedule of a multi-function thermostat.

Multi-function thermostats can be used as part of a building management system to present information to a user and to receive touch-based input from the user. Touch-based input can be received via a touch-sensitive display of a thermostat. Touch-based input can include input for configuring a time schedule of the multi-function thermostat. The schedule can include one or more events whereby each event is configured to allow selective operation of HVAC equipment. For example, an event in the schedule can be configured to reduce energy consumption when a building is unoccupied by adjusting an ambient light setting. Modifying a schedule to add new events often requires a series of manual adjustments that a user must perform.

SUMMARY

One embodiment of the present disclosure is a method for revising an event schedule of a multi-function thermostat. The method includes receiving a request to modify the event schedule. The method further includes receiving a puncture event with a time interval that conflicts with a time interval associated with an existing event of the event schedule. The method further includes storing information associated with the puncturing event in a memory. The method further includes modifying the time interval associated with the existing event. The method further includes adding the puncture event in the event schedule. The method further includes adding an adjustment event in the event schedule, wherein a time interval associated with the adjustment event corresponds to a remainder time period.

In some embodiments, the thermostat includes a touch-sensitive interface configured to receive a user input and provide a visual representation of at least one event in the event schedule. In some embodiments, the user input is a slide touch gesture.

In some embodiments, the thermostat modifies the time interval associated with the existing event by modifying a start time or an end time associated with the existing event to correspond to a start time or end time associated with the puncture event.

In some embodiments, the puncture event includes one or more parameter values associated with parameter values of the existing event.

In some embodiments, the adjustment event is not included and the thermostat is configured to modify a start time or end time associated with an existing event based on the remainder time period.

In some embodiments, the adjustment event is not included when the remainder time period is less than a threshold value. In some embodiments, the threshold value is one hour.

Another embodiment of the present disclosure is a thermostat configured to control heating and cooling of a building. The thermostat includes a user interface configured to present an event schedule to a user. The event schedule includes one or more occupied events and one or more unoccupied events. In response to receiving a request to modify the event schedule from the user, the thermostat is configured to create a puncture event that conflicts with a time interval associated with an existing event of the event schedule. In response to creating the puncture event, the thermostat is further configured to modify the time interval associated with the existing event and add the puncture event to the event schedule.

In some embodiments, an occupied event occurs during a time interval when one or more people are expected to occupy the building.

In some embodiments, an unoccupied event occurs during a time interval when people are not expected to occupy the building.

In some embodiments, modifying the time interval associated with the existing event includes modifying one or more of a start time and an end time of the existing event to correspond to a start time or an end time of the puncture event.

In some embodiments, the thermostat is further configured to add an adjustment event to the event schedule that corresponds to a remainder time interval.

In some embodiments, the remainder time interval is an interval for which neither an occupied event nor an unoccupied event exists in the event schedule.

In some embodiments, the adjustment event is omitted when the remainder time interval is less than a threshold value. In some embodiments, the threshold value is one hour.

In some embodiments, the user interface is a touch-sensitive interface and the request includes a slide touch gesture.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, a user control device is shown, according to various exemplary embodiments. The thermostat described herein may be used in any HVAC system, room, environment, or system within which it is desired to control and/or observe environmental conditions (e.g., temperature, humidity, etc.). In traditional HVAC systems, a thermostat may be adjusted by a user to control the temperature of a system.

The user control device is intended to provide the user with an ability to function as a connected smart hub. The thermostat provides a desirable user interface for other environmental controls because of its known fixed location within a space. The user control device is intended to be more personal, more efficient, and more aware than traditional thermostats.

The user control device collects data about a space and the occupants of the space with various sensors (e.g., temperature sensors, humidity sensors, acoustic sensors, optical sensors, gas and other chemical sensors, biometric sensors, motion sensors, etc.) and user inputs. The user control device may utilize data collected from a single room, multiple rooms, an entire building, or multiple buildings. The data may be analyzed locally by the user control device or may be uploaded to a remote computing system and/or the cloud for further analysis and processing. The user control device may further be able to provide environmental controls to the space based on a user schedule. Further, the user control device may allow a user to dynamically modify a schedule by adding one or more events to an existing schedule to allow for modifications to be made without having to revise the entire schedule.

Building Management System and HVAC System

Figure 1:
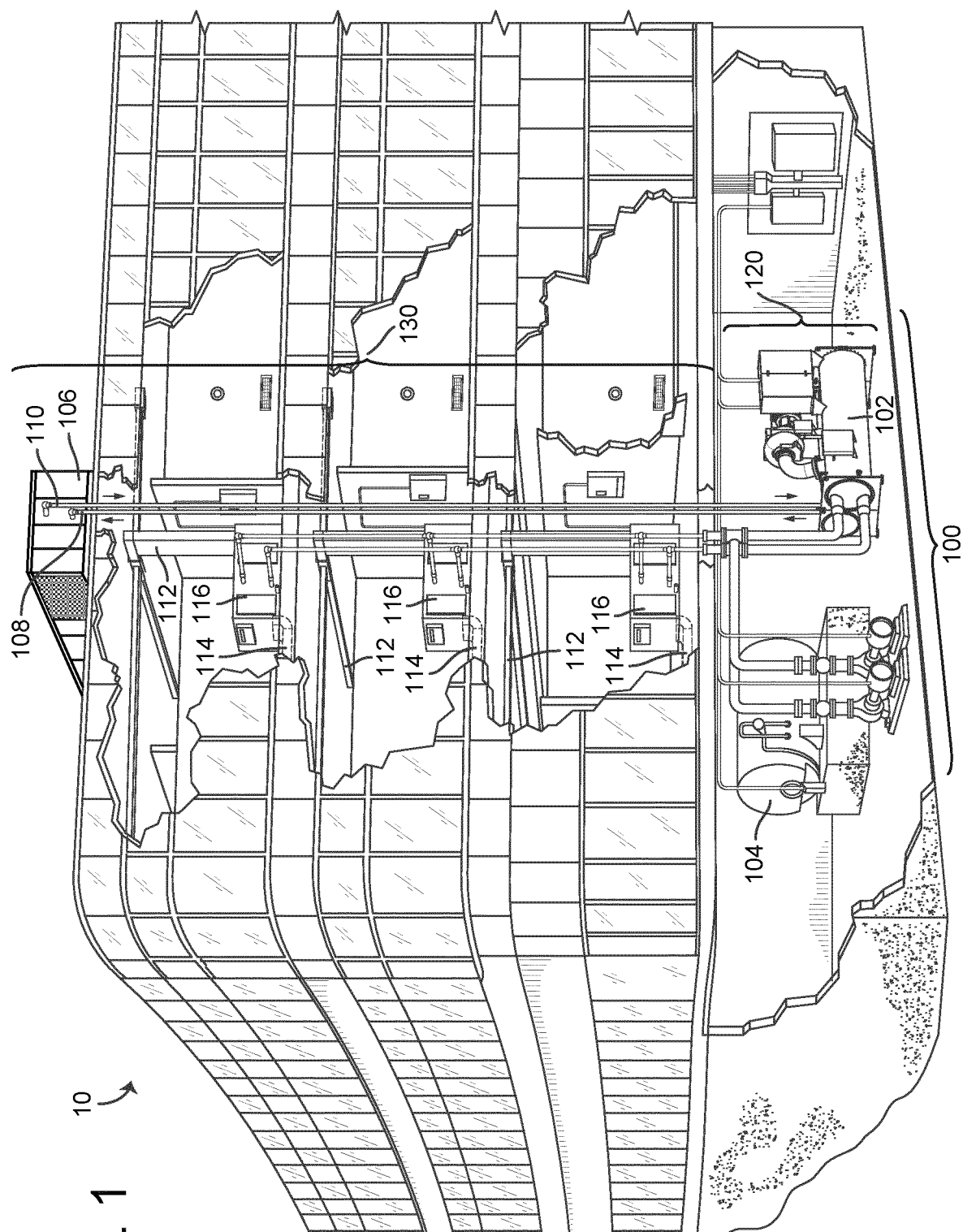
FIG. 1 is a drawing of a building equipped with a HVAC system, according to some embodiments.

Referring now to FIGS. 1-4, an exemplary building management system (BMS) and HVAC system in which the systems and methods of the present disclosure may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
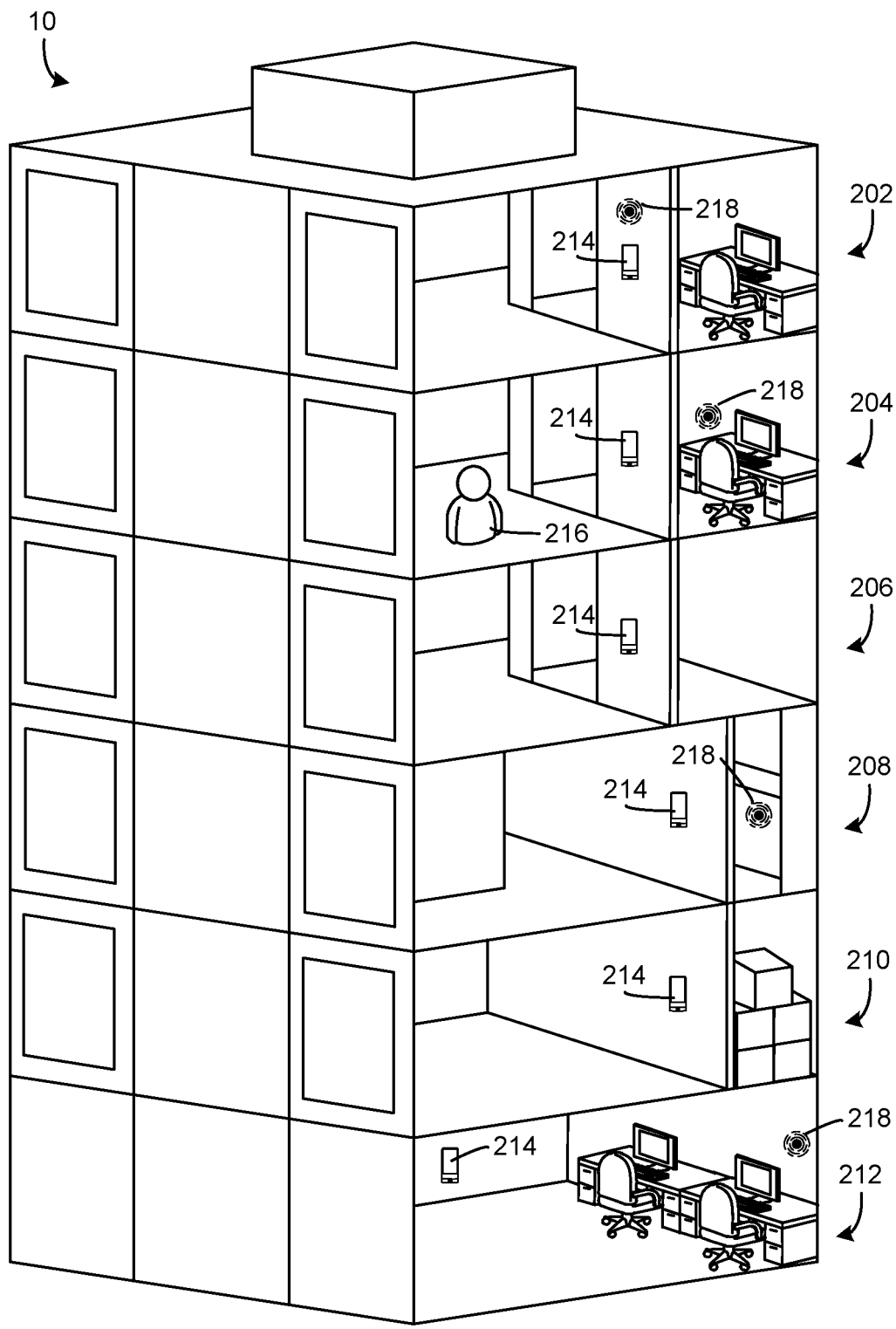
FIG. 2 is a drawing of multiple zones and floors of the building of FIG. 1 equipped with control devices, according to some embodiments.

Referring now to FIG. 2, building 10 is shown in greater detail, according to an exemplary embodiment. Building 10 may have multiple zones. In FIG. 2, building 10 has zones, 202, 204, 206, 208, 210, and 212. In building 10, the zones each correspond to a separate floor. In various embodiments, the zones of building 10 may be rooms, sections of a floor, multiple floors, etc. Each zone may have a corresponding control device 214. In some embodiments, control device 214 is at least one of a thermostat, a sensor, a controller, a display device, a concierge device, a medical monitor device, etc. Control device 214 may take input from users. The input may be an environmental setpoint, a concierge question, a payment, etc. In some embodiments, control device 214 can cause music and/or building announcements to be played in one or more of zones 202-212, cause the temperature and/or humidity to be regulated in one or more of zones 202-212, and/or any other control action.

In some embodiments, control device 214 can monitor the health of an occupant 216 of building 10. In some embodiments, control device 214 monitors heat signatures, heart-rates, and any other information that can be collected from cameras, medical devices, and/or any other health related sensor. In some embodiments, building 10 has wireless transmitters 218 in each or some of zones 202-212. The wireless transmitters 218 may be routers, coordinators, and/or any other device broadcasting radio waves. In some embodiments, wireless transmitters 218 form a Wi-Fi network, a Zigbee network, a Bluetooth network, and/or any other kind of network.

In some embodiments, occupant 216 has a mobile device that can communicate with wireless transmitters 218. Control device 214 may use the signal strengths between the mobile device of occupant 216 and the wireless transmitters 218 to determine what zone the occupant is in. In some embodiments, control device 214 causes temperature setpoints, music and/or other control actions to follow occupant 216 as the occupant 216 moves from one zone to another zone (i.e., from one floor to another floor).

In some embodiments, display devices 214 are connected to a building management system, a weather server, and/or a building emergency sensor(s). In some embodiments, display devices 214 may receive emergency notifications from the building management system, the weather server, and/or the building emergency sensor(s). Based on the nature of the emergency, display devices 214 may give directions to an occupant of the building. In some embodiments, the direction may be to respond to an emergency (e.g., call the police, hide and turn the lights off, etc.). In various embodiments, the directions given to the occupant (e.g., occupant 216) may be navigation directions. For example, zone 212 may be a safe zone with no windows an individual (e.g., occupant 216). If display devices 214 determines that there are high winds around building 10, the control device 214 may direct occupants of zones 202-210 to zone 212 if zone 212 has no windows.

Figure 3:
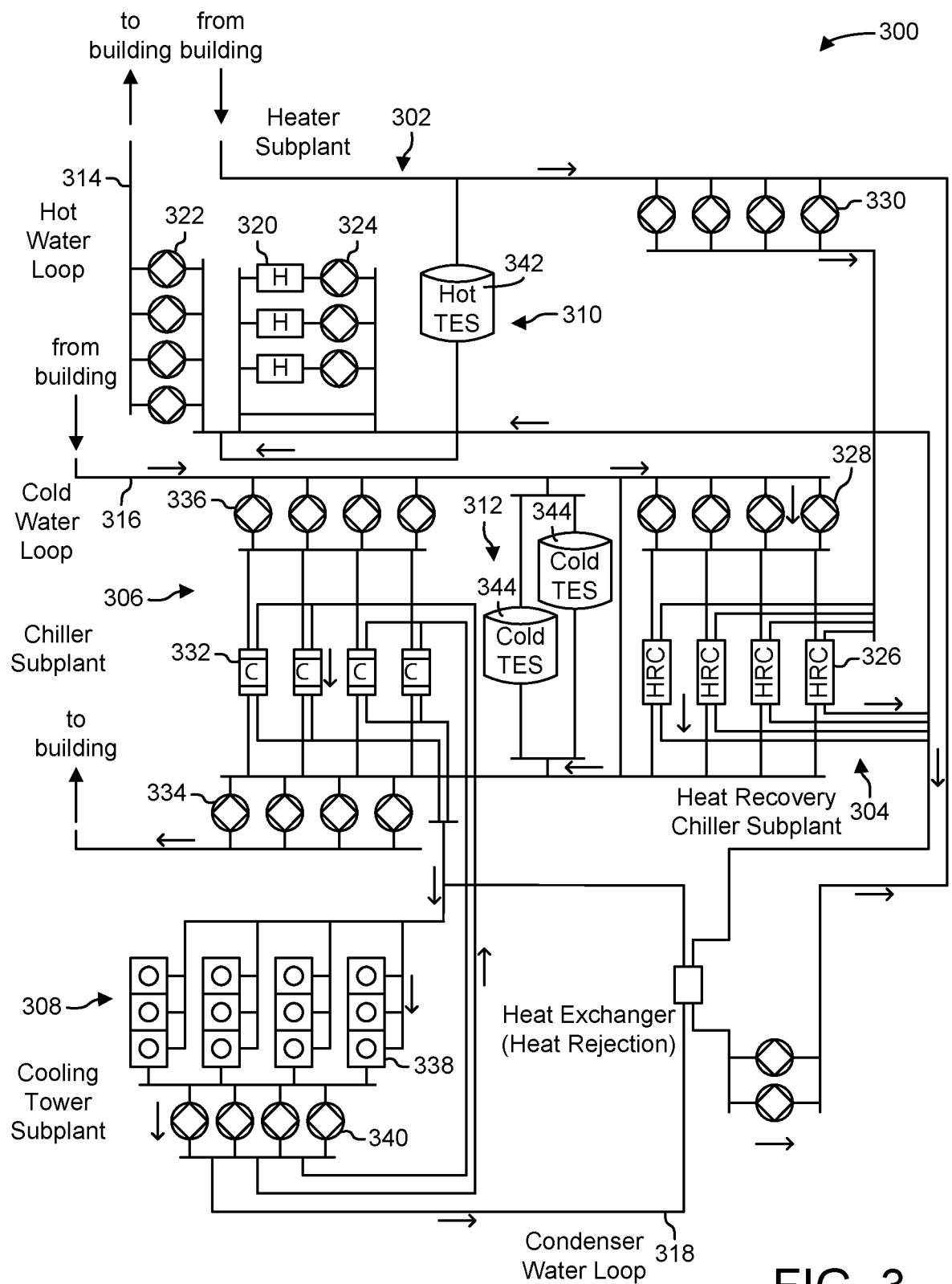
FIG. 3 is a block diagram of a waterside system that may be used in conjunction with the building of FIGS. 1-2, according to some embodiments.

Referring now to FIG. 3, a block diagram of a waterside system 300 is shown, according to an exemplary embodiment. In various embodiments, waterside system 300 may supplement or replace waterside system 120 in HVAC system 100 or may be implemented separate from HVAC system 100. When implemented in HVAC system 100, waterside system 300 may include a subset of the HVAC devices in HVAC system 100 (e.g., boiler 104, chiller 102, pumps, valves, etc.) and may operate to supply a heated or chilled fluid to AHU 106. The HVAC devices of waterside system 300 may be located within building 10 (e.g., as components of waterside system 120) or at an offsite location such as a central plant.

In FIG. 3, waterside system 300 is shown as a central plant having a plurality of subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve the thermal energy loads (e.g., hot water, cold water, heating, cooling, etc.) of a building or campus. For example, heater subplant 302 may be configured to heat water in a hot water loop 314 that circulates the hot water between heater subplant 302 and building 10. Chiller subplant 306 may be configured to chill water in a cold water loop 316 that circulates the cold water between chiller subplant 306 building 10. Heat recovery chiller subplant 304 may be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold water loop 316 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 302-312 to receive further heating or cooling.

Although subplants 302-312 are shown and described as heating and cooling water for circulation to a building, it is understood that any other type of working fluid (e.g., glycol, CO2, etc.) may be used in place of or in addition to water to serve the thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 may include a variety of equipment configured to facilitate the functions of the subplant. For example, heater subplant 302 is shown to include a plurality of heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include a plurality of chillers 332 configured to remove heat from the cold water in cold water loop 316. Chiller subplant 306 is also shown to include several pumps 334 and 336 configured to circulate the cold water in cold water loop 316 and to control the flow rate of the cold water through individual chillers 332.

Heat recovery chiller subplant 304 is shown to include a plurality of heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 226. Cooling tower subplant 208 is shown to include a plurality of cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves may be integrated with the pumps or positioned upstream or downstream of the pumps to control the fluid flows in waterside system 300. In various embodiments, waterside system 300 may include more, fewer, or different types of devices and/or subplants based on the particular configuration of waterside system 300 and the types of loads served by waterside system 300.

Figure 4:
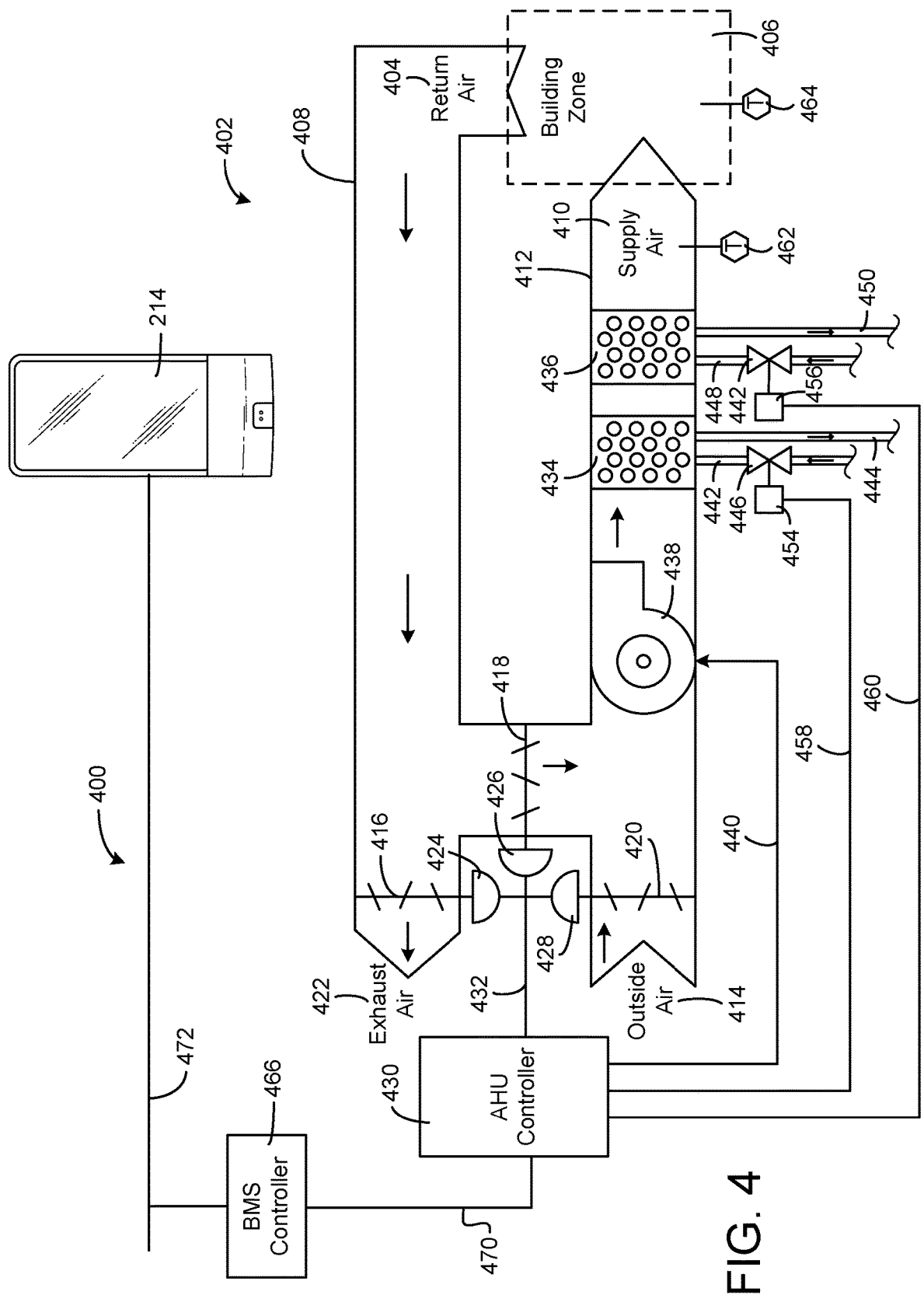
FIG. 4 is a block diagram of an airside system that may be used in conjunction with the building of FIGS. 1-2, according to some embodiments.

Referring now to FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 612. In some embodiments, AHU 402 is a rooftop unit located on the roof of building 10 (e.g., AHU 4506 as shown in FIG. 1) or otherwise positioned to receive both return air 404 and outside air 414. AHU 402 may be configured to operate exhaust air damper 416, mixing damper 418, and outside air damper 420 to control an amount of outside air 414 and return air 404 that combine to form supply air 410. Any return air 404 that does not pass through mixing damper 418 may be exhausted from AHU 402 through exhaust damper 416 as exhaust air 422.

Each of dampers 416-420 may be operated by an actuator. For example, exhaust air damper 416 may be operated by actuator 424, mixing damper 418 may be operated by actuator 426, and outside air damper 420 may be operated by actuator 428. Actuators 424-428 may communicate with an AHU controller 430 via a communications link 432. Actuators 424-428 may receive control signals from AHU controller 430 and may provide feedback signals to AHU controller 430. Feedback signals may include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that may be collected, stored, or used by actuators 424-428. AHU controller 430 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 402 is shown to include a cooling coil 434, a heating coil 436, and a fan 438 positioned within supply air duct 612. Fan 438 may be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 200 (e.g., from cold water loop 316) via piping 442 and may return the chilled fluid to waterside system 200 via piping 444. Valve 446 may be positioned along piping 442 or piping 444 to control a flow rate of the chilled fluid through cooling coil 474. In some embodiments, cooling coil 434 includes multiple stages of cooling coils that can be independently activated and deactivated (e.g., by AHU controller 430, by BMS controller 466, etc.) to modulate an amount of cooling applied to supply air 410.

Heating coil 436 may receive a heated fluid from waterside system 200 (e.g., from hot water loop 314) via piping 448 and may return the heated fluid to waterside system 200 via piping 450. Valve 452 may be positioned along piping 448 or piping 450 to control a flow rate of the heated fluid through heating coil 436. In some embodiments, heating coil 436 includes multiple stages of heating coils that can be independently activated and deactivated (e.g., by AHU controller 430, by BMS controller 466, etc.) to modulate an amount of heating applied to supply air 410.

Each of valves 446 and 452 may be controlled by an actuator. For example, valve 446 may be controlled by actuator 454 and valve 452 may be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 612 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a set point temperature for supply air 410 or to maintain the temperature of supply air 410 within a set point temperature range). The positions of valves 446 and 452 affect the amount of heating or cooling provided to supply air 410 by cooling coil 434 or heating coil 436 and may correlate with the amount of energy consumed to achieve a desired supply air temperature. AHU 430 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a control device 214. BMS controller 466 may include one or more computer systems (e.g., servers, supervisory controllers, subsystem controllers, etc.) that serve as system level controllers, application or data servers, head nodes, or master controllers for airside system 400, waterside system 200, HVAC system 100, and/or other controllable systems that serve building 10. BMS controller 466 may communicate with multiple downstream building systems or subsystems (e.g., HVAC system 100, a security system, a lighting system, waterside system 200, etc.) via a communications link 470 according to like or disparate protocols (e.g., LON, BACnet, etc.). In various embodiments, AHU controller 430 and BMS controller 466 may be separate (as shown in FIG. 4) or integrated. In an integrated implementation, AHU controller 430 may be a software module configured for execution by a processor of BMS controller 466.

In some embodiments, AHU controller 430 receives information from BMS controller 466 (e.g., commands, set points, operating boundaries, etc.) and provides information to BMS controller 466 (e.g., temperature measurements, valve or actuator positions, operating statuses, diagnostics, etc.). For example, AHU controller 430 may provide BMS controller 466 with temperature measurements from temperature sensors 462-464, equipment on/off states, equipment operating capacities, and/or any other information that can be used by BMS controller 466 to monitor or control a variable state or condition within building zone 406.

Control device 214 may include one or more of the user control devices. Control device 214 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Control device 214 may be a computer workstation, a client terminal, a remote or local interface, or any other type of user interface device. Control device 214 may be a stationary terminal or a mobile device. For example, control device 214 may be a desktop computer, a computer server with a user interface, a laptop computer, a tablet, a smartphone, a PDA, or any other type of mobile or non-mobile device. Control device 214 may communicate with BMS controller 466 and/or AHU controller 430 via communications link 472. Communications link 472 may be any kind of electronic communications link (e.g., a Wi-Fi network, a wired Ethernet network, a Zigbee network, a Bluetooth network, the Internet, a building WAN, etc.) and may use any of a variety of communications protocols (e.g., BACnet, IP, LON, etc.).

Figure 5:
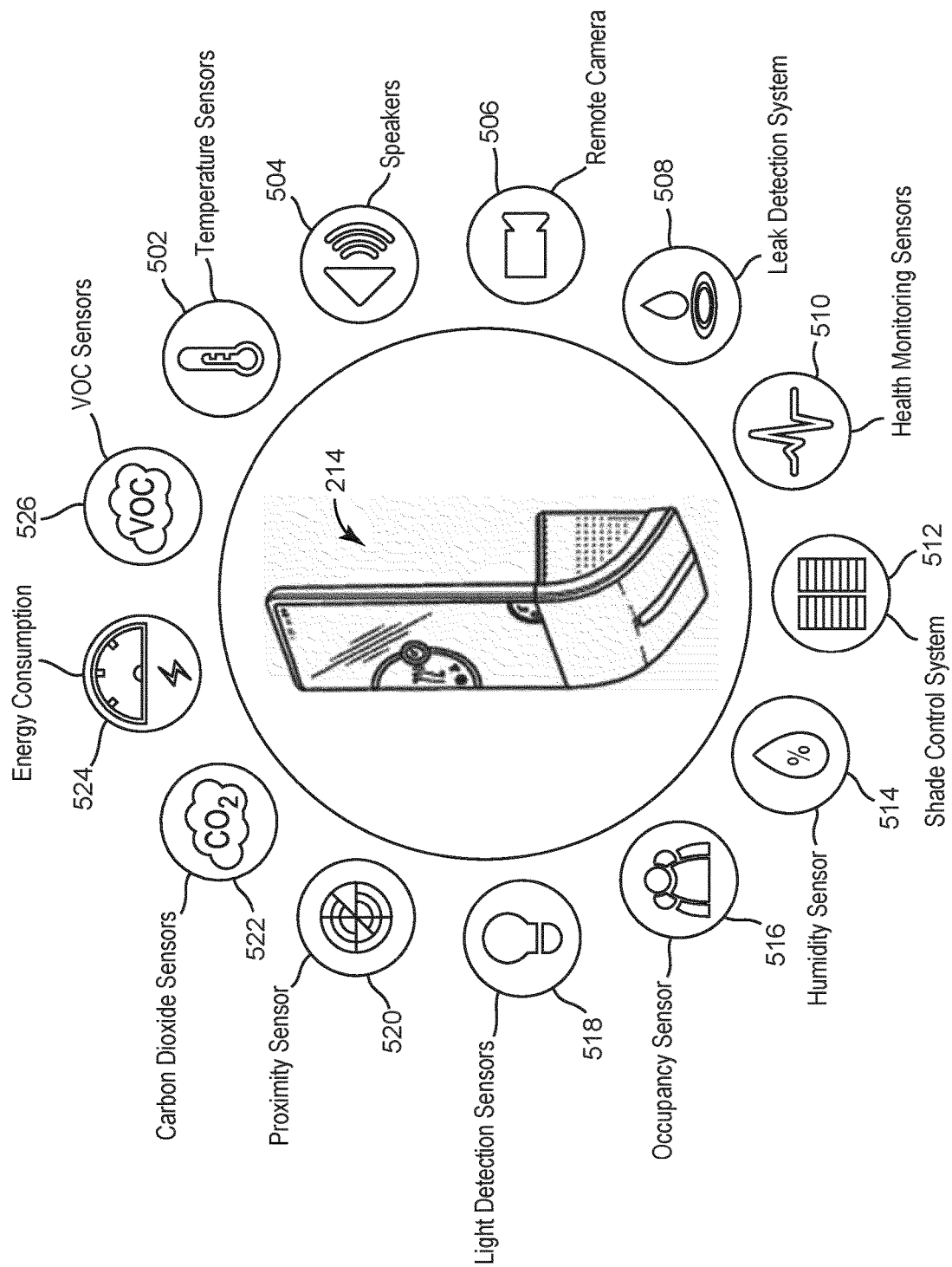
FIG. 5 is a drawing of the connections of the control device of FIG. 2 and FIG. 4, according to some embodiments.

Referring now to FIG. 5, control device 214 is shown as a connected smart hub or private area network (PAN), according to some embodiments. Control device 214 may include a variety of sensors and may be configured to communicate with a variety of external systems or devices. For example, control device 214 may include temperature sensors 502, speakers 504, a remote camera 506, a leak detection system 508, health monitoring sensors 510, a shade control system 512, humidity sensors 514, occupancy sensors 516, light detection sensors 518, proximity sensors 520, carbon dioxide sensors 522, energy consumption sensors 524, volatile organic compound sensors (VOC) 526, or any of a variety of other sensors. Alternatively, control device 214 may receive input from external sensors configured to measure such variables. The external sensors may not communicate over a PAN but may communicate with control device 214 via an IP-based network and/or the Internet.

In some embodiments, speakers 504 are located locally as a component of control device 214. Speakers 504 may be low power speakers used for playing audio to the immediate occupant of control device 214 and/or occupants of the zone in which control device 214 is located. In some embodiments, speakers 504 may be remote speakers connected to control device 214 via an electronic network. In some embodiments, speakers 504 are a building audio system, an emergency alert system, and/or alarm system configured to broadcast building wide and/or zone messages or alarms.

Control device 214 may communicate with remote camera 506, shade control system 512, leak detection system 508, HVAC system 100, or any of a variety of other external systems or devices which may be used in a home automation system or a building automation system. Control device 214 may provide a variety of monitoring and control interfaces to allow a user to control all of the systems and devices connected to control device 214. Exemplary user interfaces and features of control device 214 are described in greater detail below.

Figure 6:
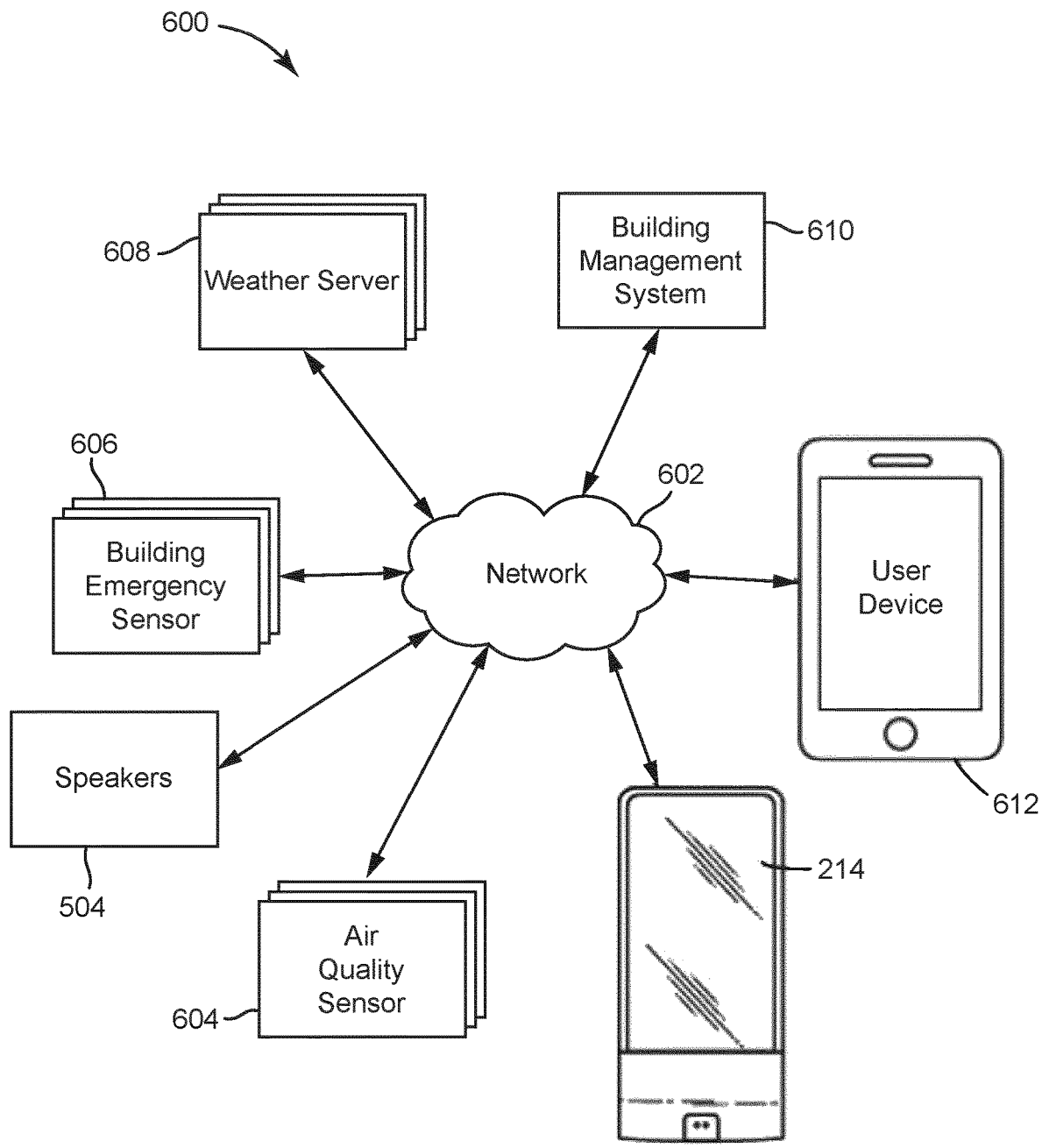
FIG. 6 is a diagram of a communications system located in the building of FIGS. 1 and 2, according to some embodiments.

Referring now to FIG. 6, a block diagram of communications system 600 is shown, according to some embodiments. System 600 can be implemented in a building (e.g. building 10) and is shown to include control device 214, an electronic network 602, air quality sensors 604, building emergency sensor(s) 606, weather server(s) 608, building management system 610, and a user device 612. System 600 connects devices, systems, and servers via network 602 so that building information, HVAC controls, emergency information, navigation directions, and other information can be passed between devices. In some embodiments, control device 214 is connected to speakers 504 as described with reference to FIG. 5.

In some embodiments, network 602 communicatively couples the devices, systems, and servers of system 600. In some embodiments, network 602 is at least one of and/or a combination of a Wi-Fi network, a wired Ethernet network, a Zigbee network, and a Bluetooth network. Network 602 may be a local area network or a wide area network (e.g., the Internet, a building WAN, etc.) and may use a variety of communications protocols (e.g., BACnet, IP, LON, etc.) Network 602 may include routers, modems, and/or network switches.

In some embodiments, control device 214 is configured to receive emergency information, navigation directions, occupant information, concierge information, air quality information, and other types of information via network 602. In some embodiments, the information is received from building management system 610 via network 602. In various embodiments, the information is received from the Internet via network 602. In some embodiments, control device 214 is at least one of, or a combination of, a thermostat, a humidistat, a light controller, and any other wall-mounted and/or handheld device.

In some embodiments, control device 214 may be communicatively coupled to weather server(s) 608 via network 602. In some embodiments, the control device 214 may be configured to receive weather alerts (e.g., high and low daily temperature, five day forecast, thirty day forecast, etc.) from weather server(s) 608. Control device 214 may be configured to receive emergency weather alerts (e.g., flood warnings, fire warnings, thunder storm warnings, winter storm warnings, etc.) In some embodiments, control device 214 may be configured to display emergency warnings via a user interface of control device 214 when control device 214 receives an emergency weather alert from weather server(s) 608. The control device 214 may be configured to display emergency warnings based on the data received from building emergency sensor(s) 606. In some embodiments, the control device 214 may cause a siren (e.g., speakers 504 and/or building emergency sensor(s) 606) to alert occupants of the building of an emergency, cause all doors to become locked and/or unlocked, cause an advisory message be broadcast through the building, and control any other actuator or system necessary for responding to a building emergency. In further embodiments, the weather server(s) 608 may be configured to provide air quality information to the control device 214. For example, the weather server(s) 608 may provide air quality information such as pollen levels, mold levels, particulate levels, etc.

In some embodiments, control device 214 is configured to communicate with building management system 610 via network 602. Control device 214 may be configured to transmit environmental setpoints (e.g., temperature setpoint, humidity setpoint, etc.) to building management system 610. In some embodiments, building management system 610 may be configured to cause zones of a building (e.g., building 10) to be controlled to the setpoint received from control device 214. In further embodiments, the building management system 610 may be configured to control one or more fans or ventilators to provide air flow into and out of a building (e.g. building 10). In some embodiments, building management system 610 may be configured to control the lighting of a building. In some embodiments, building management system 610 may be configured to transmit emergency information to control device 214. In some embodiments, the emergency information is a notification of an active shooter lockdown, a tornado warning, a flood warning, a thunderstorm warning, and/or any other warning. In some embodiments, building management system 610 is connected to various weather servers or other web servers from which building management system 610 receives emergency warning information. In various embodiments, building management system is a computing system of a hotel. Building management system 610 may keep track of hotel occupancy, may relay requests to hotel staff, and/or perform any other functions of a hotel computing system.

Control device 214 is configured to communicate with user device 612 via network 602. In some embodiments, user device 612 is a smartphone, a tablet, a laptop computer, and/or any other mobile and/or stationary computing device. In some embodiments, user device 612 communicates calendar information to control device 214. In some embodiments, the calendar information is stored and/or entered by a user into calendar application 614. In some embodiments, calendar application 414 is at least one of Outlook, Google Calendar, Fantastical, Shifts, CloudCal, DigiCal, and/or any other calendar application. In some embodiments, control device 214 receives calendar information from the calendar application such as times and locations of appointments, times and locations of meetings, and/or any other information. Control device 214 may be configured to display building map direction to a user associated with user device 612 and/or any other information.

In some embodiments, a user may press a button on a user interface of control device 214 indicating a building emergency. The user may be able to indicate the type of emergency (e.g., fire, flood, active shooter, etc.) Control device 214 may communicate an alert to building management system 610, user device 612, and any other device, system, and/or server.

Figure 7:
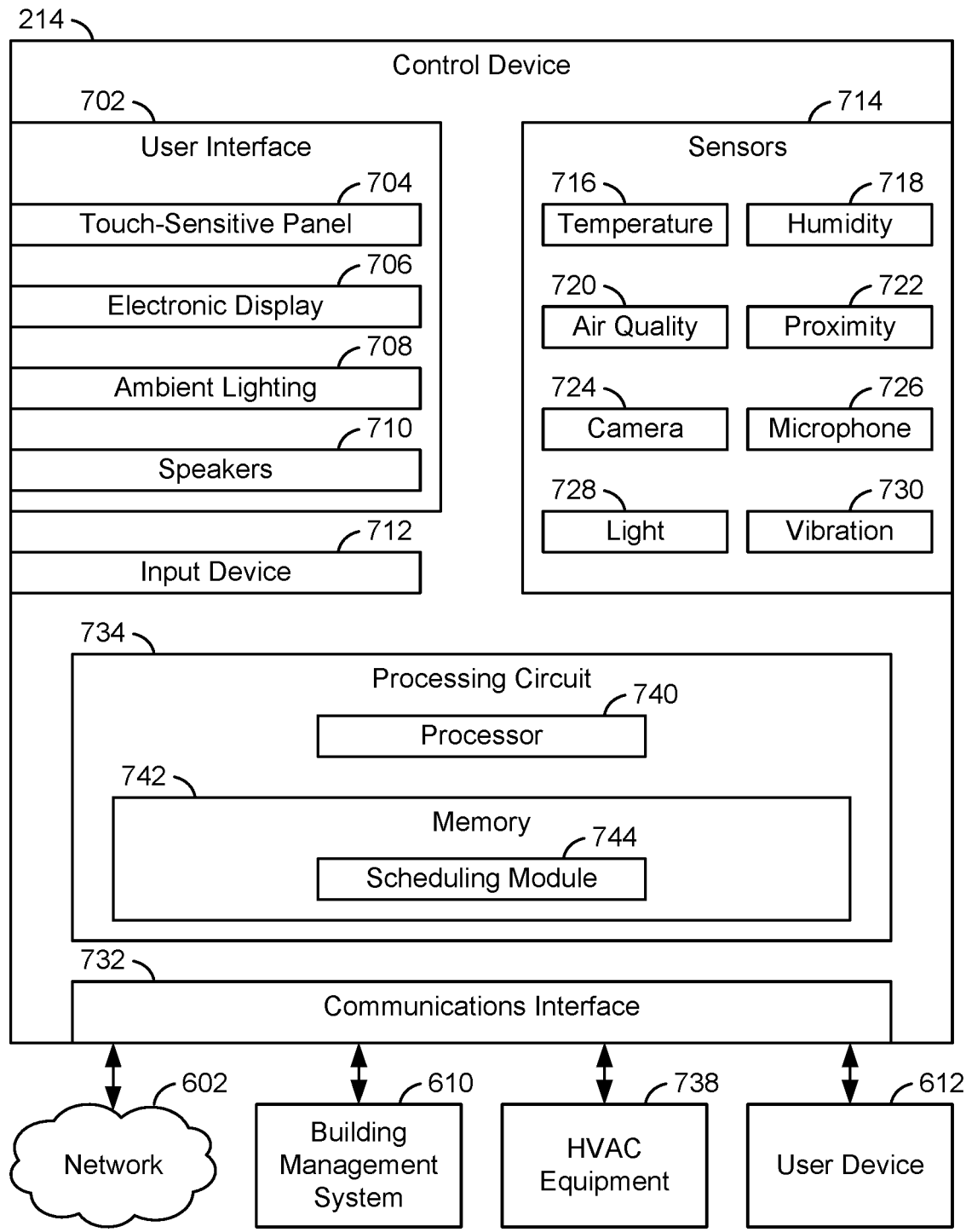
FIG. 7 is a block diagram illustrating the control device of FIGS. 2, 3, and 5 in greater detail, according to some embodiments.

Referring now to FIG. 7, a block diagram illustrating control device 214 in greater detail is shown, according to some embodiments. Control device 214 is shown to include a variety of user interface devices 702. User interface devices 702 may be configured to receive input from a user and provide output to a user in various forms. For example, user interface devices 702 are shown to include a touch-sensitive panel 704, an electronic display 706, ambient lighting 708, speakers 710 (e.g., speakers 504), and an input device 712. Input device 712 may include a microphone configured to receive voice commands from a user, a keyboard, buttons, switches, dials, and/or any other user-operable input device. It is contemplated that user interface devices 702 may include any type of device configured to receive input from a user and/or provide an output to a user in any of a variety of forms (e.g., touch, text, video, graphics, audio, vibration, etc.).

Touch-sensitive panel 704 may be a touchscreen or other type of electronic display configured to present information to a user in a visual format (e.g., daily schedule, text, graphics, etc.) and receive input from a user (e.g., via a touch-sensitive panel). For example, touch sensitive panel 704 may include a touch-sensitive panel layered on top of an electronic visual display. A user can provide inputs through simple or multi-touch gestures by touching panel 704 with one or more fingers and/or with a stylus or pen. Touch-sensitive panel 704 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of display 706 allowing registration of touch in two or even more locations at once. Display 706 may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the display 706 is configured to present visual media (e.g., text, graphics, etc.) without requiring a backlight.

The control device 214 may also include, or be in communication with, a number of sensors 714. The sensors 714 may be configured to measure a variable state or condition of the environment in which control device 214 is installed. For example, sensors 714 are shown to include a temperature sensor 716, a humidity sensor 718, an air quality sensor 720, a proximity sensor 722, a camera 724, a microphone 726, a light sensor 728, and a vibration sensor 730. Air quality sensor 720 may be configured to measure any of a variety of air quality variables such as oxygen level, carbon dioxide level, carbon monoxide level, allergens, pollutants, smoke, VOCs, etc. Proximity sensor 722 may include one or more sensors configured to detect the presence of people or devices proximate to control device 214. For example, proximity sensor 722 may include a near-field communications (NFC) sensor, a radio frequency identification (RFID) sensor, a Bluetooth sensor, a capacitive proximity sensor, a biometric sensor, or any other sensor configured to detect the presence of a person or device. Camera 724 may include a visible light camera, a motion detector camera, an infrared camera, an ultraviolet camera, an optical sensor, or any other type of camera. Light sensor 728 may be configured to measure ambient light levels. Vibration sensor 730 may be configured to measure vibrations from earthquakes or other seismic activity at the location of control device 214.

Still referring to FIG. 7, control device 214 is shown to include a communications interface 732 and a processing circuit 734. Communications interface 732 may include wired or wireless interfaces (e.g., jacks, antennas, transmitters, receivers, transceivers, wire terminals, etc.) for conducting data communications with various systems, devices, or networks. For example, communications interface 732 may include an Ethernet card and port for sending and receiving data via an Ethernet-based communications network and/or a Wi-Fi transceiver for communicating via a wireless communications network. Communications interface 732 may be configured to communicate via local area networks or wide area networks (e.g., the Internet, a building WAN, etc.) and may use a variety of communications protocols (e.g., BACnet, IP, LON, etc.).

Communications interface 732 may include a network interface configured to facilitate electronic data communications between control device 214 and various external systems or devices (e.g., network 602, building management system 610, HVAC equipment 738, user device 612, etc.) For example, control device 214 may receive information from building management system 610 or HVAC equipment 738 indicating one or more measured states of the controlled building (e.g., temperature, humidity, electric loads, etc.) and one or more states of HVAC equipment 738 (e.g., equipment status, power consumption, equipment availability, etc.).

In some embodiments, HVAC equipment 738 may be lighting systems, building systems, actuators, chillers, heaters, and/or any other building equipment and/or system. Communications interface 732 may receive inputs from building management system 610 or HVAC equipment 738 and may provide operating parameters (e.g., on/off decisions, set points, etc.) to building management system 610 or HVAC equipment 738. The operating parameters may cause building management system 610 to activate, deactivate, or adjust a set point for various types of home equipment or building equipment in communication with control device 214.

Processing circuit 734 is shown to include a processor 740 and memory 742. Processor 740 may be a general purpose or specific purpose processor, an application specific integrated circuit (ASIC), one or more field programmable gate arrays (FPGAs), a group of processing components, or other suitable processing components. Processor 740 may be configured to execute computer code or instructions stored in memory 742 or received from other computer readable media (e.g., CDROM, network storage, a remote server, etc.).

Memory 742 may include one or more devices (e.g., memory units, memory devices, storage devices, etc.) for storing data and/or computer code for completing and/or facilitating the various processes described in the present disclosure. Memory 742 may include random access memory (RAM), read-only memory (ROM), hard drive storage, temporary storage, non-volatile memory, flash memory, optical memory, or any other suitable memory for storing software objects and/or computer instructions. Memory 742 may include database components, object code components, script components, or any other type of information structure for supporting the various activities and information structures described in the present disclosure. Memory 742 may be communicably connected to processor 740 via processing circuit 734 and may include computer code for executing (e.g., by processor 740) one or more processes described herein. For example, memory 742 is shown to include a scheduling module 744. However, other modules, such as voice command and control modules, building modules, payment modules, hotel modules, healthcare modules, occupancy modules, emergency modules and the like may also be included in memory 742. The functions of some of these modules is described in greater detail below.

Puncture Event in Scheduler

Figure 8:
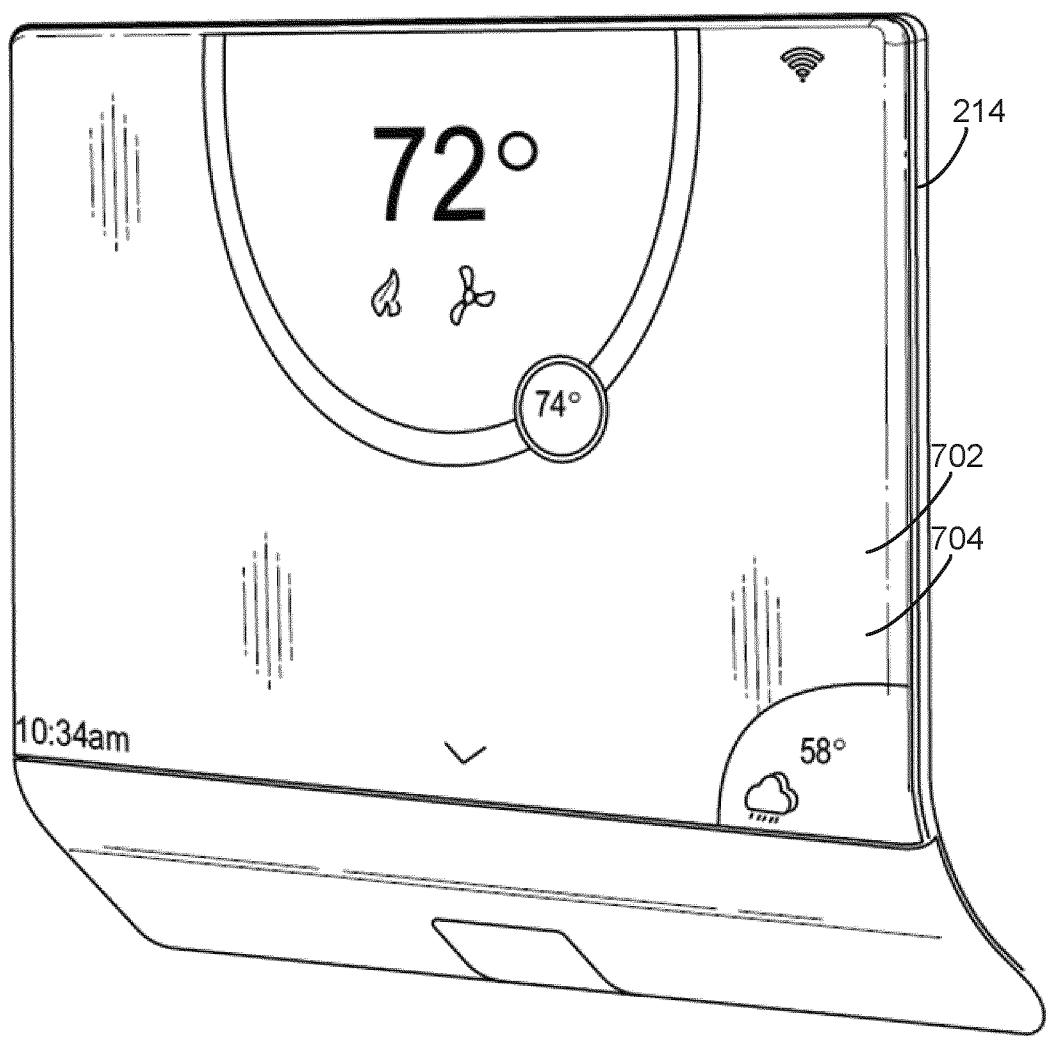
FIG. 8 is a drawing of a multi-function thermostat with a touch-screen display, according to some embodiments.

Referring to FIG. 8, one embodiment of a multi-function control device 214 is shown. Control device 214 is shown to include user interface 702, which can include touch-sensitive panel 704 and electronic display 706. Control device 214 with user interface 702 is generally configured to display a visual representation of an "event schedule." An event schedule includes a plurality of time intervals whereby a user can associate an event with one or more of the time intervals. Each event can correspond to one or more programmable setting or configuration of multi-function control device 214. For example, programmable settings of an event can relate to operation of ambient lighting 708, speakers 710, sensors 714, HVAC equipment 738, etc. A user can interact with user interface 702 to configure the event schedule, events, programmable settings, and the like.

In an example embodiment, the event schedule is a one-day schedule with twenty-four intervals. Each of the twenty-four intervals corresponds to a one hour of the day, whereby a user can associate each of the twenty-four intervals with one of two events. However, in some embodiments, the one-day schedule may be separated into more than twenty-four intervals or fewer than twenty four intervals. The two events are an "occupied" event and an "away" event. An occupied event relates to a time period when one or more zones of building 10 are occupied. The user can interact with control device 214 to create the occupied event and associate the occupied event with one or more settings of HVAC equipment 738, such as a preset temperature setting and/or a preset ambient light setting of building 10. The user can also create an "away" event corresponding to another preset temperature setting and/or another preset ambient light setting, for example, to reduce energy consumption when building 10 is unoccupied. The user may, for example, associate the away event with ten intervals corresponding to a time period between 8:00 AM and 5:59 PM. The user can associate the occupied event for the remaining fourteen hours of the day.

In some embodiments, the event schedule includes a day schedule, a week schedule, and/or a month schedule. Event schedules can be stored in memory 742 and can be configured to repeat. For example, a user can configure a week schedule that repeats every week. The week schedule can include seven day schedules, for example as discussed above, whereby each of the seven day schedules corresponds to a day of the week. In this regard, by creating repeating event schedules to include the occupied event and the away event, control device 214 can be configured to autonomously adjust various settings in a manner that reduces energy costs.

Figure 9:
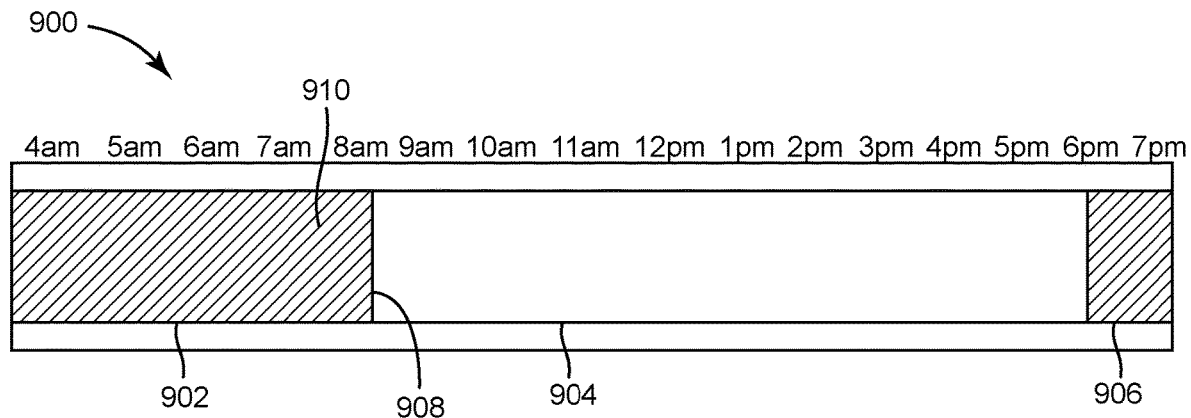
FIG. 9 is a user interface illustrating an event schedule of the multi-function thermostat displayed on multi-function thermostat of FIGS. 7-8, according to some embodiments.

Referring to FIG. 9, a user interface depicts a visual representation of an example event schedule 900. Event schedule 900 includes an occupied event and an away event visually represented as blocks of time, whereby each block includes one or more events. In this regard, as user can easily see the event schedule. Occupied event block 902 is associated with a time block between 4:00 AM and 7:59 AM, and occupied event block 906 is associated with a time block between 6:00 PM and 6:59 PM. Away event block 904 is associated with a time block between 8:00 AM and 5:59 PM. In other embodiments, events can be visually represented differently from FIG. 9.

Each event block can have a start boundary and an end boundary visually represented on electronic display 706 of user interface 702. The start boundary can correspond to a start time of an event block, and the end boundary can correspond to an end time of an event block. Referring to the example event schedule 900, occupied event block 902 has an end boundary 910 corresponding to an end time of 7:59 AM of occupied event block 902. Away event block 904 has a start boundary 908 corresponding to a start time of 8:00 AM of away event block 904.

A user can interact with touch-sensitive panel 704 using various touch gestures to adjust an event block start time and/or end time. In an embodiment, user interface 702 can be configured to receive a "slide" touch gesture to adjust a start boundary or end boundary. The user can touch user interface 702 with a finger near a boundary and slide the finger along either direction of a horizontal axis to selectively adjust the boundary. Referring to the example event schedule 900, if the user desires to adjust the end time of occupied event block 902 to 7:00 AM, the user can touch user interface 702 near end boundary 910 and slide to the left. In this regard, touch-sensitive panel 704 is configured to receive the user's slide gesture, and electronic display 706 is configured to react to the slide gesture by simultaneously moving displayed end boundary 910 to the left.

Figure 10A:
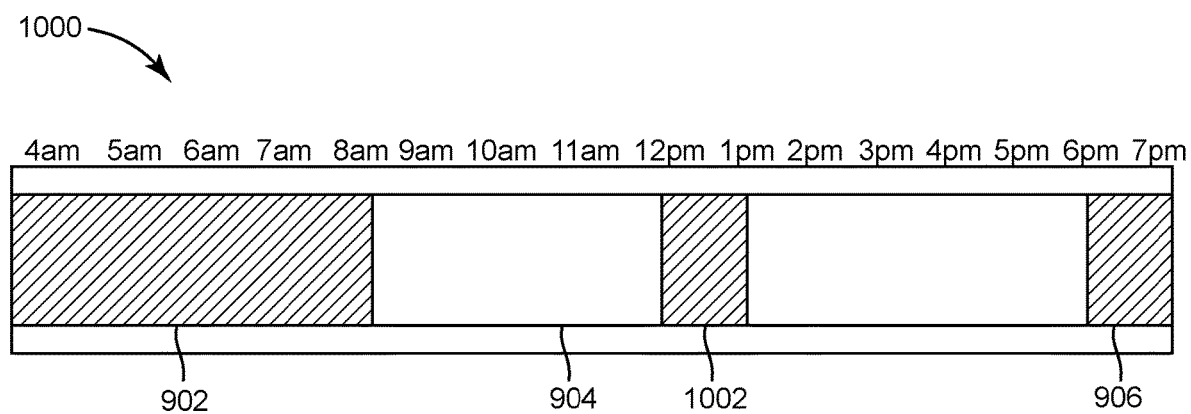
FIG. 10A is another user interface illustrating an event schedule of the multi-function thermostat displayed on multi-function thermostat of FIGS. 7-8, according to some embodiments.

Referring to FIG. 10A, another user interface of control device 214 shows a visual representation of an example event schedule 1000 displayed on user interface 702 of control device 214. In some circumstances, it may be desirable to modify an existing event schedule, such as event schedule 900, to introduce a new event block or to modify an existing event block. However, introducing a new event block can create a time conflict with one or more existing event blocks. Referring to example event schedule 1000, if a user wishes to introduce a new occupied event 1002 block corresponding to a time block between 12:00 PM and 12:59 PM, a time conflict arises with respect to away block 904. As a result, a series of manual operations may be required, including adjusting boundaries of existing events and creating new events.

Figure 10B:
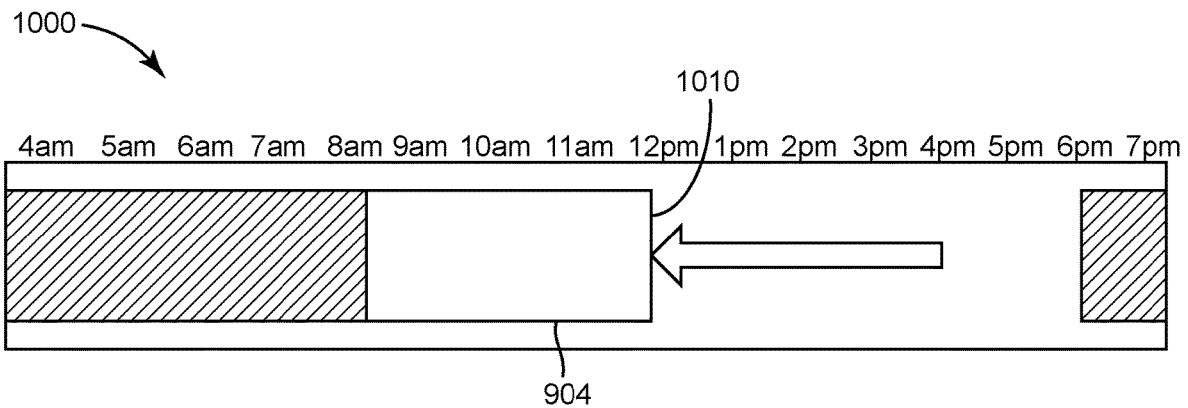
FIG. 10B is another user interface illustrating an event schedule of the multi-function thermostat displayed on multi-function thermostat of FIGS. 7-8, according to some embodiments.
Figure 10C:
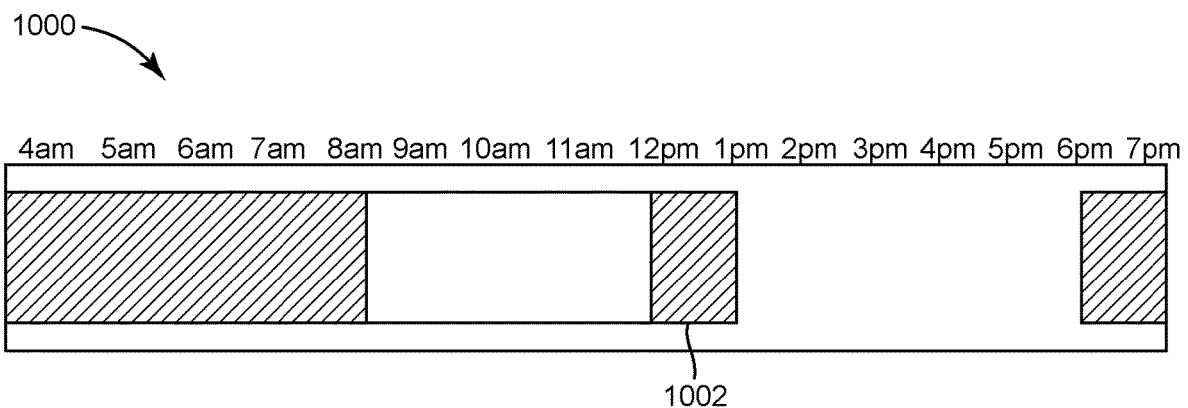
FIG. 10C is another user interface illustrating an event schedule of the multi-function thermostat displayed on multi-function thermostat of FIGS. 7-8, according to some embodiments.
Figure 10D:
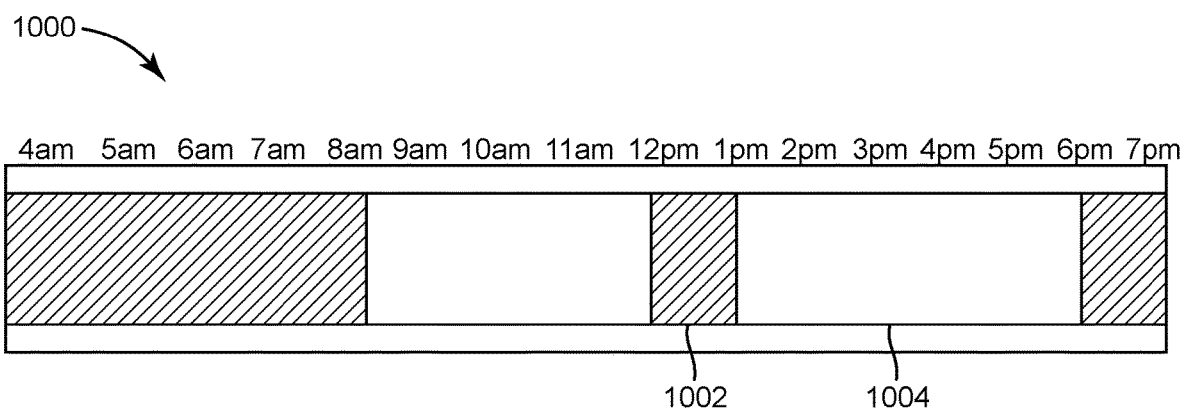
FIG. 10D is another user interface illustrating an event schedule of the multi-function thermostat displayed on multi-function thermostat of FIGS. 7-8, according to some embodiments.

Referring to FIGS. 10B-10D, user interfaces of control device 214 show manual operations that may be required to introduce new occupied event block 1002 in a manner that avoids time conflicts. The manual operations are performed by the user interacting with user interface 702. First, as shown in FIG. 10B, the end boundary 1010 of away block 904 is adjusted to correspond to end time of 11:59 PM. Next, as shown in FIG. 10C, new event block 1002 is created and inserted into event schedule 1000. New event block 1002 has a start boundary corresponding to a start time of 12:00 PM and an end boundary corresponding to an end time of 12:59 PM. Next, as shown in FIG. 10D, a replacement occupied event block 1004 is created and inserted into event schedule 1000. Replacement occupied event block 1004 has a start boundary corresponding to 1:00 PM and an end boundary corresponding to 5:59 PM.

Figure 11:
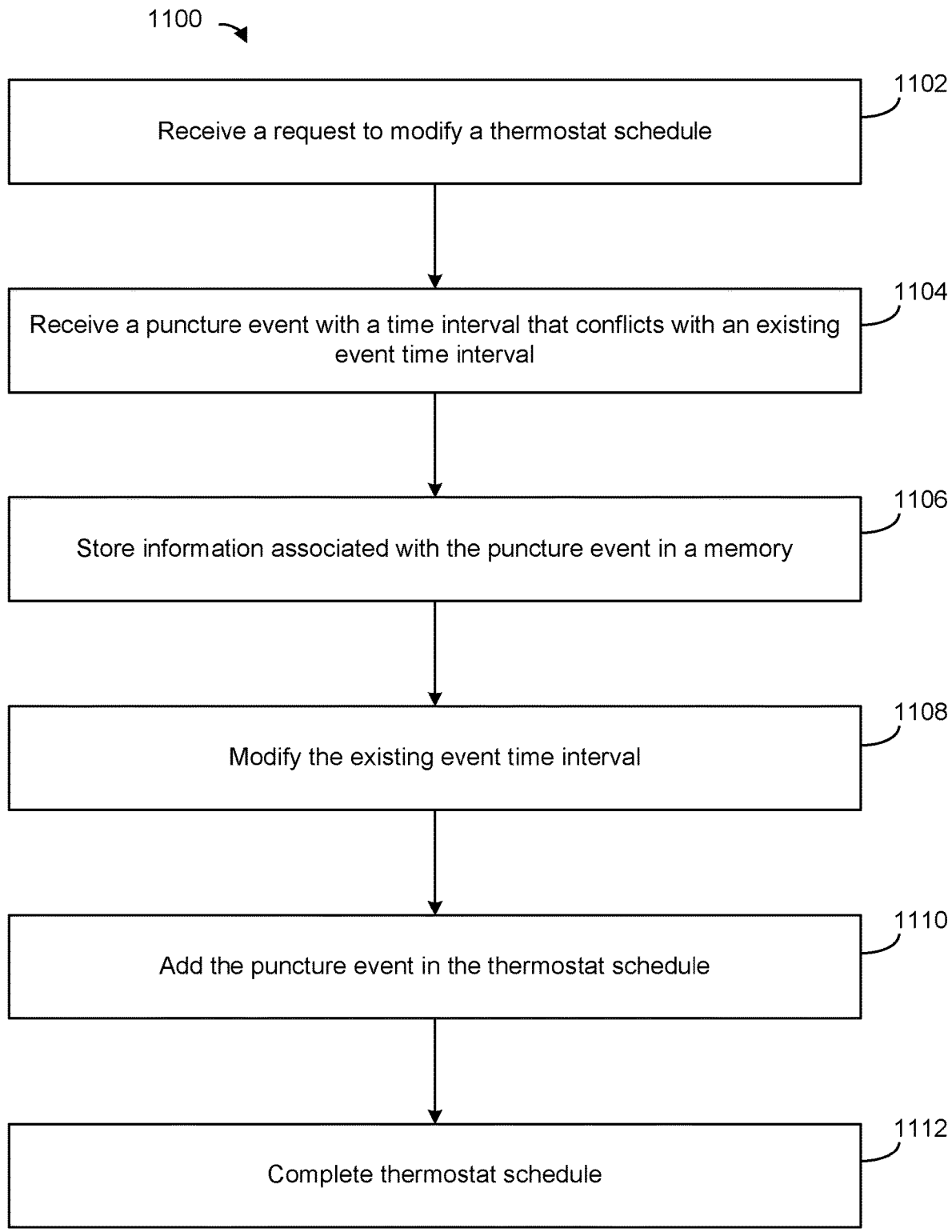
FIG. 11 is a flow-chart of an improved process for modifying an event schedule with a puncture event, according to some embodiments.

FIG. 11 shows an improved process 1100 for introducing a new event with a time interval that conflicts with a time interval of an existing event block. The new event can be designated as a "puncture" event, for example. Existing methods generally require a series of manual operations, such as described in FIGS. 10B-10D, however process 1100 allows a user to avoid the series of manual operations. Process 1100 can be performed by control device 214. In this regard, a user can interact with touch-sensitive panel 704 of user interface 702 to facilitate process 1100.

At step 1102, the thermostat receives a request to modify an event schedule. The event schedule can be visually represented on user interface 702, such as event schedule 900 in FIG. 9. The request can be received from a user interacting with user interface 702 of control device 214. For example, a settings mode of control device 214 can allow a user to create a puncture event via user interface 702 and adjust parameters of the puncture event, such as a start and end time, HVAC equipment settings, etc.

At step 1104, a puncture event is received. The puncture event is generally an event with a time interval that conflicts with a time interval associated with an existing event. The puncture event can be visually represented as an event "block" as described above. In some arrangements, user interface 702 enables a user to create an event selectively designated as a puncture event. When a time interval associated with the puncture event conflicts with an existing event, control device 214 can be configured to automatically perform various steps, as described below in steps 1106-1112. In some embodiments, a puncture event is visually represented on user interface 702. In this regard, control device 214 can be configured to allow a user to drag and drop a puncture event into an event schedule using various gestures.

At step 1106, information associated with the puncture event is stored in a memory. In some embodiments, control device 214 performs step 1106. Information associated with the puncture event can include an event name, a time interval (e.g. start time and end time), HVAC settings, etc. In some embodiments, control device 214 stores an indicator that uniquely designates an event as a puncture event. Control device 214 is configured to permit selective retrieval of the stored information, such as during step 1100.

At step 1108, a time interval associated with the existing event is modified. Control device 214 can be generally configured to modify the time interval such that the existing event time interval does not conflict with a time interval associated with the puncture event. Control device 214 can accomplish this by modifying a start time and/or end time of the existing event. In some embodiments, control device 214 is also configured to modify an event boundary corresponding a start time and/or end time and that is visually represented on user interface 702.

At step 1110, the puncture event is added to the thermostat schedule. In some embodiments, the control device 214 initially retrieves stored information from step 406 prior to adding the puncture event. For example, stored information can be information relating to a time interval (e.g. a start and end time) associated with the puncture event and/or other control device 214 settings. Control device 214 can subsequently configure the event schedule to include the puncture event with its associated time interval. In some embodiments, the puncture event is visually represented as a time block on user interface 702 of control device 214. In this regard, the puncture event may have an event boundary adjacent to an event boundary of the existing event.

At step 1112, the event schedule is completed. In some arrangements, control device 214 completes the event schedule by automatically creating an adjustment event and adding the adjustment event to the event schedule. The time interval of the adjustment event generally corresponds to a remainder time period, whereby the remainder time period is a time period initially occupied by an existing event and only partially occupied by the puncture event, due to steps 1108 and 1110. Other parameters of the adjustment event (e.g. HVAC equipment settings) can be configured to correspond to parameters of the existing event. In an embodiment, the adjustment event has a start time associated with the end time of the puncture event and an end time associated with the original end time of existing event (i.e. prior to step 1108). For example, referring to the example embodiment in FIG. 10C, event schedule can include adjustment event block 1004 with a start boundary corresponding to 1:00 PM and an end time boundary corresponding to 5:59 PM.

In some embodiments, control device 214 completes the event schedule according to preset conditions. In some arrangements, control device 214 compares the remainder time period to a threshold value. The threshold value can be any time value, such as thirty minutes, one hour, two hours, etc. The control device 214 can be configured to automatically perform various actions based on the comparison. For example, control device 214 can be configured to create an adjustment event only if the remainder time period is greater than a threshold period of one hour.

In some embodiments, when remainder time period is less than the threshold value, control device 214 is configured to modify one or more time intervals. For example, when remainder time period is less than the threshold value, a start time or end time of an existing event can be extended to include the remainder time period. In another example embodiment, a start or end time of the puncture event can be extended to include the remainder time period.

In some embodiments, one or more prompts can be provided to user via user interface 702. Prompts can relate to modifications of events during steps 1102-1112. For example, prompts can request the user to confirm modifications by control device 214 and/or to modify a time interval and other parameters associated with an event. User interface 702 can be configured to receive input from user in response to the prompts by detecting one or more gestures of the user.

Configuration of Exemplary Embodiments

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for revising an event schedule of a multi-function thermostat, the method comprising:
   receiving a request to modify the event schedule;
   receiving a puncture event with a first time interval that conflicts with a second time interval associated with an existing event of the event schedule;
   storing information associated with the puncture event in a memory;
   modifying the second time interval associated with the existing event;
   adding the puncture event in the event schedule; and
   adding an adjustment event in the event schedule, wherein a third time interval associated with the adjustment event corresponds to a remainder time period, and wherein the remainder time period is not zero.

2. The method of claim 1, wherein the multi-function thermostat comprises a touch-sensitive interface configured to receive user input and provide a visual representation of at least one event in the event schedule.

3. The method of claim 2, wherein the user input is a slide touch gesture.

4. The method of claim 1, wherein modifying the second time interval associated with the existing event comprises modifying at least one of a start time or an end time of the existing event to correspond to a start time or an end time of the puncture event.

5. The method of claim 1, wherein the puncture event comprises at least one HVAC equipment setting that is different from HVAC equipment settings associated with the existing event.

6. The method of claim 1, wherein the existing event comprises a first existing event, and wherein adding the adjustment event is omitted and a start time or an end time associated with a second existing event is modified to include the remainder time period.

7. A method for revising an event schedule of a multi-function thermostat, the method comprising:
 receiving a request to modify the event schedule;
 receiving a puncture event with a first time interval that conflicts with a second time interval associated with an existing event of the event schedule;
 storing information associated with the puncture event in a memory;
 modifying the second time interval associated with the existing event;
 adding the puncture event in the event schedule; and
 adding an adjustment event in the event schedule, wherein a third time interval associated with the adjustment event corresponds to a remainder time period, and wherein adding the adjustment event is omitted when the remainder time period is less than a threshold value.

8. The method of claim 7, wherein the threshold value is one hour.

9. The method of claim 7, wherein the existing event comprises a first existing event, and wherein a start time or an end time of a second existing event is modified to include the remainder time period when the remainder time period is less than the threshold value.

10. The method of claim 9, wherein the threshold value is one hour.

11. A multi-function thermostat configured to control and observe environmental conditions of a building, the thermostat comprising:
 a user interface configured to present an event schedule to a user;
 a controller comprising a processing circuit communicably coupled to the user interface, wherein the processing circuit of the controller is configured to:
  create a puncture event in the event schedule having a first time interval that conflicts with a second time interval associated with an existing event in the event schedule in response to receiving a request to modify the event schedule from the user via the user interface;
  modify the second time interval associated with the existing event; and
  create an adjustment event in the event schedule having a third time interval that corresponds to a remainder time period, wherein the remainder time period is not zero.

12. The thermostat of claim 11, wherein the puncture event is an occupied event that occurs when one or more people are expected to occupy the building.

13. The thermostat of claim 12, wherein the existing event is an unoccupied event that occurs when people are not expected to occupy the building.

14. The thermostat of claim 11, wherein the processing circuit of the controller is configured to modify the second time interval associated with the existing event by modifying a start time or an end time of the existing event to correspond to a start time or an end time of the puncture event.

15. The thermostat of claim 11, wherein the remainder time period is an interval for which an event does not exist in the event schedule after the processing circuit of the controller modifies the existing event and creates the adjustment event.

16. The thermostat of claim 15, wherein the adjustment event is omitted when the remainder time period is less than a threshold value.

17. The thermostat of claim 16, wherein the threshold value is one hour.

18. The thermostat of claim 11, wherein the user interface is a touch-sensitive interface.

19. The thermostat of claim 18, wherein the request includes a slide touch gesture.

20. A heating, ventilation, or air conditioning (HVAC) system, the system comprising:
 one or more processors; and
 one or more computer-readable storage media having instructions stored thereon that, when executed by the one or more processors, cause the one or more processors to implement operations comprising:
  receiving a request to add a puncture event to an event schedule for the HVAC system, the puncture event having a first time interval that conflicts with a second time interval associated with an existing event of the event schedule;
  modifying the existing event such that the existing event becomes associated with a third time interval different from the second time interval;
  adding the puncture event to the event schedule; and
  adding an adjustment event to the event schedule having a fourth time interval that corresponds to a remainder time period, wherein a sum of the first time interval, the third time interval, and the fourth time interval equals the second time interval.

* * * * *